US012602172B1

(12) United States Patent
In et al.

(10) Patent No.: US 12,602,172 B1
(45) Date of Patent: Apr. 14, 2026

(54) OPERATING IN A WRITE THROUGH MODE TRANSITION WHILE MAINTAINING DATA INTEGRITY AFTER AN ABRUPT SHUTDOWN ON A STORAGE DEVICE

(71) Applicant: Sandisk Technologies, Inc., Milpitas, CA (US)

(72) Inventors: Ji-Hyun In, Saratoga, CA (US); Dhanunjaya Rao Gorrle, San Jose, CA (US); Thomas Ta, Saratoga, CA (US); Xiaoying Li, Fremont, CA (US); Aajna Karki, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/914,526

(22) Filed: Oct. 14, 2024

(51) Int. Cl.
*G06F 3/06* (2006.01)

(52) U.S. Cl.
CPC .......... *G06F 3/0619* (2013.01); *G06F 3/0634* (2013.01); *G06F 3/0673* (2013.01)

(58) Field of Classification Search
CPC ..... G06F 3/0619; G06F 3/0634; G06F 3/0673
See application file for complete search history.

(56) References Cited

U.S. PATENT DOCUMENTS

| | | | |
|---|---|---|---|
| 6,957,301 | B2 | 10/2005 | Deenadhayalan |
| 8,572,422 | B2 | 10/2013 | Fukuyama |
| 8,707,096 | B2 | 4/2014 | Sekino |
| 9,274,713 | B2 | 3/2016 | Simionescu |
| 11,175,713 | B2 | 11/2021 | Zupanc |
| 11,409,442 | B2 | 8/2022 | Yano |
| 2011/0051276 | A1* | 3/2011 | Fukuyama ............ G06F 1/3203 |
| 2011/0138221 | A1* | 6/2011 | Hanaoka ............ G06F 11/1441 |
| | | | 714/6.1 |
| 2013/0097458 | A1* | 4/2013 | Sekino ................ G06F 11/1441 |
| | | | 714/E11.138 |
| 2019/0041938 | A1* | 2/2019 | Zupanc ..................... G06F 1/30 |

* cited by examiner

*Primary Examiner* — Jason W Blust
(74) *Attorney, Agent, or Firm* — Arlene P. Neal; NEAL BLIBO LLC

(57) ABSTRACT

A storage device may transition from operating in a write-back mode to a write-through mode and may use a transition mode to maintain data integrity on a boot-up. The storage device includes a volatile memory to store acknowledged host data and a persistent memory to store the host data; The storage device may operate in a write-back mode and flush the acknowledged host data in the volatile memory to the persistent memory when a capacitor power is greater than a threshold. The storage device may operate in a write-through transition mode, flush the acknowledged host data in the volatile memory to the persistent memory when the capacitor power is less than the threshold and move to the write-through mode when the acknowledged host data is copied to the persistent memory.

20 Claims, 8 Drawing Sheets

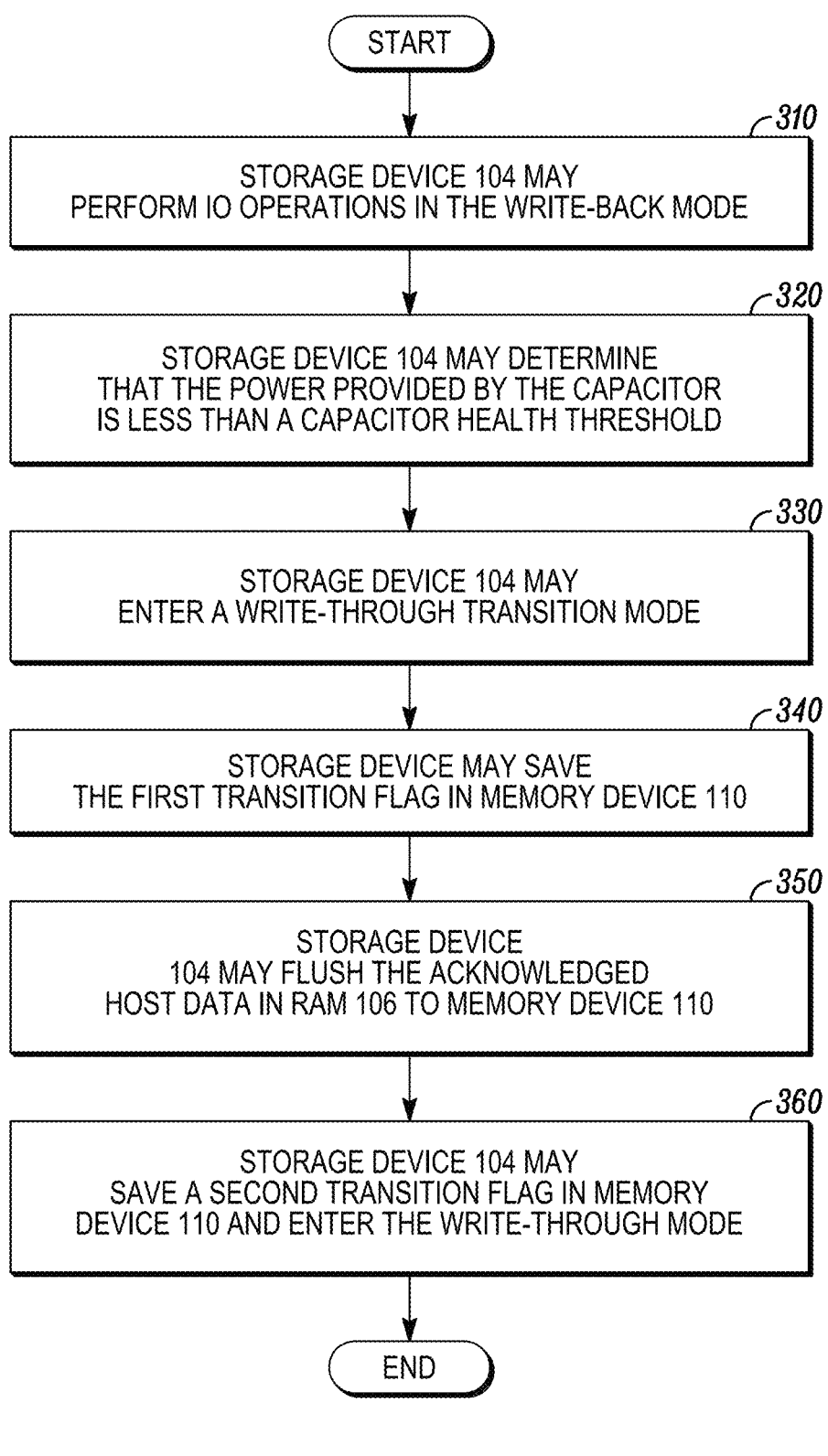

START

*310*

STORAGE DEVICE 104 MAY
PERFORM IO OPERATIONS IN THE WRITE-BACK MODE

*320*

STORAGE DEVICE 104 MAY DETERMINE
THAT THE POWER PROVIDED BY THE CAPACITOR
IS LESS THAN A CAPACITOR HEALTH THRESHOLD

*330*

STORAGE DEVICE 104 MAY
ENTER A WRITE-THROUGH TRANSITION MODE

*340*

STORAGE DEVICE MAY SAVE
THE FIRST TRANSITION FLAG IN MEMORY DEVICE 110

*350*

STORAGE DEVICE
104 MAY FLUSH THE ACKNOWLEDGED
HOST DATA IN RAM 106 TO MEMORY DEVICE 110

*360*

STORAGE DEVICE 104 MAY
SAVE A SECOND TRANSITION FLAG IN MEMORY
DEVICE 110 AND ENTER THE WRITE-THROUGH MODE

END

*FIG. 3*

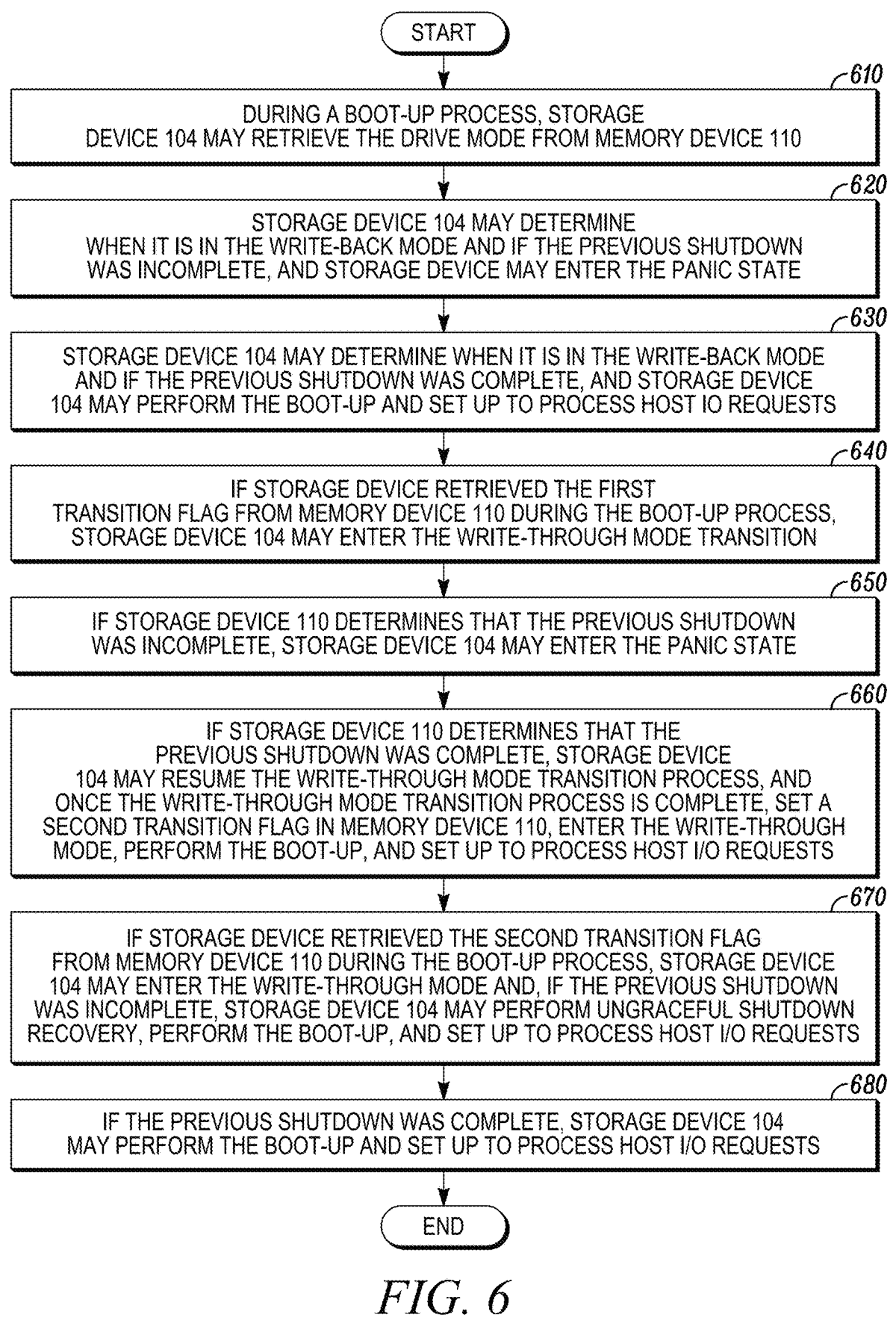

START

*610*

DURING A BOOT-UP PROCESS, STORAGE
DEVICE 104 MAY RETRIEVE THE DRIVE MODE FROM MEMORY DEVICE 110

*620*

STORAGE DEVICE 104 MAY DETERMINE
WHEN IT IS IN THE WRITE-BACK MODE AND IF THE PREVIOUS SHUTDOWN
WAS INCOMPLETE, AND STORAGE DEVICE MAY ENTER THE PANIC STATE

*630*

STORAGE DEVICE 104 MAY DETERMINE WHEN IT IS IN THE WRITE-BACK MODE
AND IF THE PREVIOUS SHUTDOWN WAS COMPLETE, AND STORAGE DEVICE
104 MAY PERFORM THE BOOT-UP AND SET UP TO PROCESS HOST IO REQUESTS

*640*

IF STORAGE DEVICE RETRIEVED THE FIRST
TRANSITION FLAG FROM MEMORY DEVICE 110 DURING THE BOOT-UP PROCESS,
STORAGE DEVICE 104 MAY ENTER THE WRITE-THROUGH MODE TRANSITION

*650*

IF STORAGE DEVICE 110 DETERMINES THAT THE PREVIOUS SHUTDOWN
WAS INCOMPLETE, STORAGE DEVICE 104 MAY ENTER THE PANIC STATE

*660*

IF STORAGE DEVICE 110 DETERMINES THAT THE
PREVIOUS SHUTDOWN WAS COMPLETE, STORAGE DEVICE
104 MAY RESUME THE WRITE-THROUGH MODE TRANSITION PROCESS, AND
ONCE THE WRITE-THROUGH MODE TRANSITION PROCESS IS COMPLETE, SET A
SECOND TRANSITION FLAG IN MEMORY DEVICE 110, ENTER THE WRITE-THROUGH
MODE, PERFORM THE BOOT-UP, AND SET UP TO PROCESS HOST I/O REQUESTS

*670*

IF STORAGE DEVICE RETRIEVED THE SECOND TRANSITION FLAG
FROM MEMORY DEVICE 110 DURING THE BOOT-UP PROCESS, STORAGE DEVICE
104 MAY ENTER THE WRITE-THROUGH MODE AND, IF THE PREVIOUS SHUTDOWN
WAS INCOMPLETE, STORAGE DEVICE 104 MAY PERFORM UNGRACEFUL SHUTDOWN
RECOVERY, PERFORM THE BOOT-UP, AND SET UP TO PROCESS HOST I/O REQUESTS

*680*

IF THE PREVIOUS SHUTDOWN WAS COMPLETE, STORAGE DEVICE 104
MAY PERFORM THE BOOT-UP AND SET UP TO PROCESS HOST I/O REQUESTS

END

*FIG. 6*

OPERATING IN A WRITE THROUGH MODE TRANSITION WHILE MAINTAINING DATA INTEGRITY AFTER AN ABRUPT SHUTDOWN ON A STORAGE DEVICE

BACKGROUND OF THE INVENTION

A storage device may be communicatively coupled to a host and to non-volatile/persistent memory including, for example, a NAND flash memory device on which the storage device may store data received from the host. When the storage device receives a host write request, the storage device may operate in a write-back mode, wherein the storage device may cache the data in a volatile memory on the storage device and send an acknowledgement to the host to inform the host that the write request has been completed. The storage device may later flush the data from the volatile memory to the persistent memory device. To protect the data stored in the volatile memory in case of, for example, a power failure, and provide full power loss protection, the storage device may include one or more power capacitors. When a power failure occurs, the storage device may use power provided by the capacitors to ensure that the data in the volatile memory is flushed to the persistent memory device as part of a graceful shutdown sequence.

In some cases, there may be a capacitor circuit failure during sudden power failure and the capacitors may have less power than is needed to flush the data stored in the volatile memory to the persistent memory device and the storage device may be unable to provide full power loss protection. On a boot-up, the storage device may determine that the previous shutdown flow resulted in an incomplete/ungraceful shutdown. As a result of the ungraceful shutdown, the storage device may be unable to guarantee that the acknowledged host data was successfully copied to the persistent memory device and the storage device may report a drive error and enter a panic/read only state.

In cases where, for example, the storage device determines after a graceful shutdown that the power capacitors may not provide sufficient power to enable the storage device to perform a graceful shutdown in case of a sudden power failure, the storage device may transition from the write-back mode to a write-through mode. In the write-through mode, the storage device may guarantee data integrity by writing data directly to the persistent memory device prior to sending an acknowledgement to the host. The storage device must guarantee the integrity of acknowledged host data when operating in the write-back mode or the write-through mode. In other words, the storage device must guarantee that the acknowledged host data has been successfully stored on the persistent memory device when the storage device is operating in the write-back mode or the write-through mode. There is currently no approach for gracefully transitioning from the write-back mode to the write-through mode while maintaining the integrity of acknowledged host data or detecting data integrity failure when a sudden power failure occurs.

SUMMARY OF THE INVENTION

In some implementations, the storage device may transition from operating in a write-back mode to a write-through mode and use a transition mode to maintain data integrity on a boot-up. The storage device includes a volatile memory to store acknowledged host data and a persistent memory to store the host data. The storage device may operate in a write-back mode and flush the acknowledged host data in the volatile memory to the persistent memory when a capacitor power is greater than a threshold. The storage device may operate in a write-through transition mode, flush the acknowledged host data in the volatile memory to the persistent memory when the capacitor power is less than the threshold and to move to the write-through mode when the acknowledged host data is copied to the persistent memory.

In some implementations, a method is provided on a storage device for transitioning from operating in a write-back mode to a write-through mode and for using a transition mode to maintain data integrity on a boot-up. The method includes operating in a write-back mode when a capacitor power is greater than a threshold and flushing acknowledged host data in a volatile memory to a persistent memory. The method also includes switching to operate in a write-through transition mode when the capacitor power is less than the threshold and flushing the acknowledged host data in the volatile memory to the persistent memory. The method further includes moving to a write-through mode when the acknowledged host data is copied to the persistent memory.

In some implementations, a storage device may transition from operating in a write-back mode to a write-through mode. A controller may boot-up the storage device and obtain a drive state. The controller may determine if the storage device is operating in a write-back mode, a write-through transition mode, or a write-through mode. The storage device may enter a panic state if the storage device is operating in the write-back mode or the write-through transition mode and a previous shutdown is incomplete. The storage device may perform an ungraceful shutdown recovery if the storage device is operating in the write-through mode and the previous shutdown is incomplete. The storage device may complete the boot-up in the write-back mode, the write-through transition mode, or the write-through mode that was used prior to the previous shutdown if the previous shutdown is complete.

BRIEF DESCRIPTION OF THE DRAWINGS

FIG. 3 is an example flow diagram for transitioning the storage device from a write-back mode to a write-through mode in accordance with some implementations.

FIG. 6 is an example flow diagram of a boot-up process on the storage device in accordance with some implementations.

Figure 1:
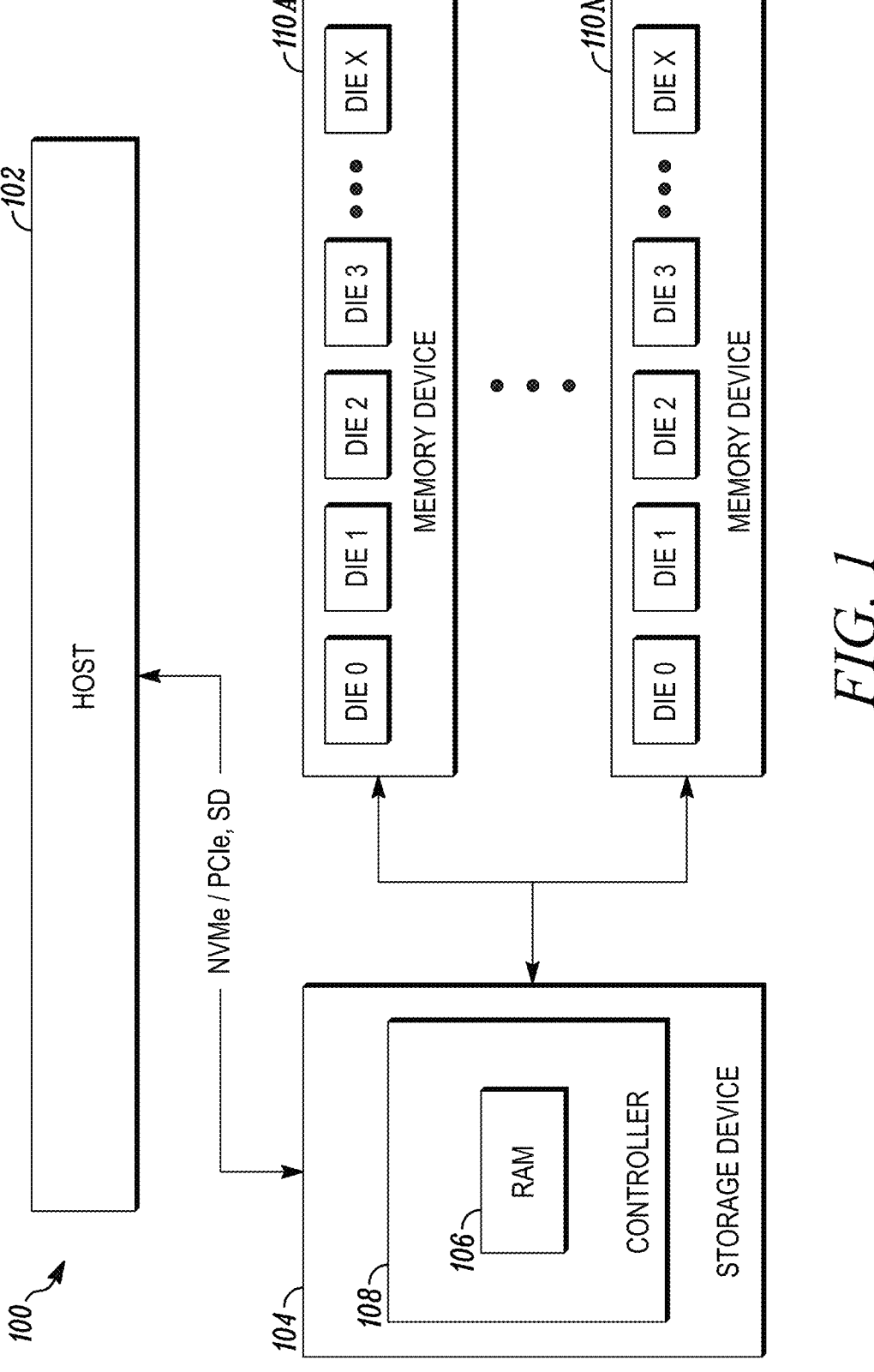
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Storage device 104 may communicate with host 102 via a Non-Volatile Memory Express (NVMe) protocol over a peripheral component interconnect express (PCIe) interface, and the like. Host 102 may include additional components (not shown in this figure for the sake of simplicity).

Storage device 104 may include a random-access memory (RAM) 106, a controller 108, and one or more non-volatile memory devices 110a-110n (referred to herein as the memory device(s) 110). Storage device 104 may be, for example, a data center solid-state drive (SSD) that may operate in a write-back mode or a write-through mode. RAM 106 may be, for example, a static RAM (SRAM) or dynamic RAM (DRAM) that be used to temporarily store, for example, host data and/or metadata (generally referred to herein as host data) before the data is written to memory device 110.

Controller 108 may interface with host 102 and process foreground operations including instructions transmitted from host 102. For example, controller 108 may read data from and/or write to memory device 110 based on instructions received from host 102. When storage device is operating in the write-back mode, controller 108 may cache data received from host 102 in RAM 106 and send an acknowledgement to host 102. Controller 108 may later flush the data from RAM 106 to memory device 110. When storage device 104 is operating in a write-through mode, controller 108 may store data received from host 102 directly in memory device 110 and send an acknowledgement to host 102. Controller 108 may also execute background operations to manage resources on memory device 110. For example, controller 108 may monitor memory device 110 and may execute garbage collection and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include multiple dies (for example, DIE 0-DIE X) for storing the data. Memory device 110 may be included in storage device 104 or may be otherwise communicatively coupled to storage device 104.

In addition to operating in the write-back mode and the write-through mode, storage device 104 may also operate a write-through transition mode to maintain the integrity of acknowledged host data. Storage device 104 may use power provided by one or more capacitors (not shown) to provide power-loss-protection (PLP) in case of power failure. Storage device 104 may set a capacitor health threshold at a level above which power provided by one or more capacitors may be sufficient to flush acknowledged host data in RAM 106 to memory device 110 in case, for example, of a power failure. As such, when the power provided by the capacitors is above the capacitor health threshold, storage device 104 may operate in the write-back mode.

When storage device is in the write-back mode, if there is power failure on storage device 104, storage device 104 may use the power provided by the capacitor(s) to copy cached host data to memory device 110 during a PLP shutdown. On a boot-up, if storage device 104 determines that the PLP shutdown process was incomplete, storage device 104 may go to a panic/read only state because storage device 104 may have lost acknowledged host data that was not copied from RAM 106 to memory device 110 before the incomplete shutdown. An incomplete shutdown may occur during a graceful shutdown or a PLP shutdown due to sudden power failure and the lack of power loss protection.

While in the write-back mode, if storage device, for example, detects capacitor failure or determines that the power provided by the capacitors is less than the capacitor health threshold, storage device 104 may enter the write-through transition mode. Controller 108 may store a first transition flag in persistent storage such as memory device 110. While storage device 104 is in the write-through transition mode, controller 108 may flush the acknowledged host data that was stored in RAM 106 when storage device 104 was in the write-back mode to memory device 110. After flushing the acknowledged host data in RAM 106 to memory device 110, controller 108 may prepare storage device 104 to handle sudden power failure by setting a second transition flag that may be associated with the write-through mode, storing the second transition flag in memory device 110, and preparing storage device 104 to enter the write-through mode. Until the acknowledged host data is completely flushed into memory device 110, and while transitioning from write-back mode to write-through mode, storage device 104 may use the write-through transition mode to maintain the data integrity on a boot-up and/or an abrupt or graceful shutdown.

If there is a shutdown of storage device 104 while storage device 104 is in the write-through transition mode, storage device may perform a PLP operation. If storage device 104 completes the PLP process, when storage device 104 is booted up, storage device 104 may check the drive state (i.e., check whether the first transition flag is stored in memory device 110), boot-up in the write-through transition mode if the first transition flag is stored in memory device 110 and maintain the first transition flag in memory device 110. Storage device 104 may continue to flush the acknowledged host data in RAM 106 to memory device 110 and prepare to enter the write-through mode. If storage device 104 failed to complete the PLP shutdown process during the previous shutdown, storage device 104 may lose the acknowledged host data/metadata that was stored in RAM 106 and enter the panic/read only state.

If the power capacitors fail while storage device 104 is in the write-back mode such that storage device 104 is unable to rely on the power provided by the capacitors to flush the acknowledged host data from RAM 106 to memory device 110, storage device 104 may be unable to guarantee that the already acknowledged host data is saved in memory device 110 without the PLP feature at an abnormal shutdown. After storage device 104 detects the power capacitor failure (for example, the power falls below the capacitor health threshold), storage device 104 may enter the write-through transition mode, save the acknowledged host data from RAM 106 into the memory device 110, and prepare the enter the write-through mode. While storage device 104 prepares to enter write-through mode, if there is no sudden power failure, storage device 104 may safely enter write-through mode. However, if there is a sudden power failure while storage device 104 prepares to enter the write-through mode, storage device 104 may not have enough capacitor power and could lose the acknowledged host data. In this case, storage device 104 may detect the failure and enter the panic state.

Storage device 104 may thus use the capacitor health threshold to detect when the power provided by the capacitors is falling below a point where storage device may have sufficient capacitor power to save the acknowledged host data at a power failure. Storage device 104 may use the capacitor health threshold to determine when it may enter the write-through transition mode. In some cases, storage device 104 may have extra capacitors for emergency purposes. When storage device 104 detects a capacitor circuit failure, storage device 104 may compare the capacitor health threshold to the power provided by the extra capacitors and may enter the write-through transition mode when the power provided by the extra capacitors is less than the capacitor health threshold to save the acknowledged host data successfully at an abrupt shutdown.

Once the acknowledged host data is completely flushed to memory device 110 and storage device 104 enters the write-through mode, storage device 104 may save host data directly to memory device 110 and send write completion acknowledgements to host 102 when storage device 104 saves the host data on memory device 110. In the write-through mode, storage device 104 may not rely on the power capacitors. As such, if sudden power failure occurs in the write-through mode, storage device 104 does not have to guarantee any acknowledged host data. When storage device 104 in the write-through mode shuts down and is rebooted, storage device 104 may recover the host data from memory device 110 at a particular commit point, thus maintaining the data integrity even after an ungraceful shutdown Consider the following example of a boot-up process by storage device 104. On boot-up, storage device 104 may retrieve the drive mode from memory device 110. If storage device 104 is in the write-back mode and storage device 104 detects that the previous shutdown was incomplete, storage device may enter the panic state. If storage device 104 is in the write-back mode and storage device 104 detects that the previous shutdown was complete, storage device 104 may perform the boot-up and set up to process host input/output (IO) requests.

On boot-up if storage device retrieves the first transition flag from memory device 110, storage device 104 may enter the write-through mode transition and determine if the previous shutdown was incomplete. An incomplete shutdown may cause storage device 104 to lose the acknowledged host data. Hence, storage device 104 may enter the panic state. If the previous shutdown was successful, storage device 104 may resume the write-through mode transition process. Once the write-through mode transition process is complete, storage device 104 may set the second transition flag in memory device 110, enter the write-through mode, perform the boot-up, and set up to process host I/O requests.

On boot-up if storage device retrieves the second transition flag from memory device 110, storage device 104 may enter the write-through mode and determine if the previous shutdown was incomplete. If the previous shutdown was incomplete, because storage device 104 only acknowledged host data in the write-through mode that was written to memory device 110 prior to the previous shutdown, storage device 104 may perform ungraceful shutdown recovery, perform the boot-up, and set up to process host I/O requests. If the previous shutdown was complete, storage device 104 may perform the boot-up and set up to process host I/O requests. As such, in the write-through mode, acknowledged host data may not be lost even with the sudden power failure Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
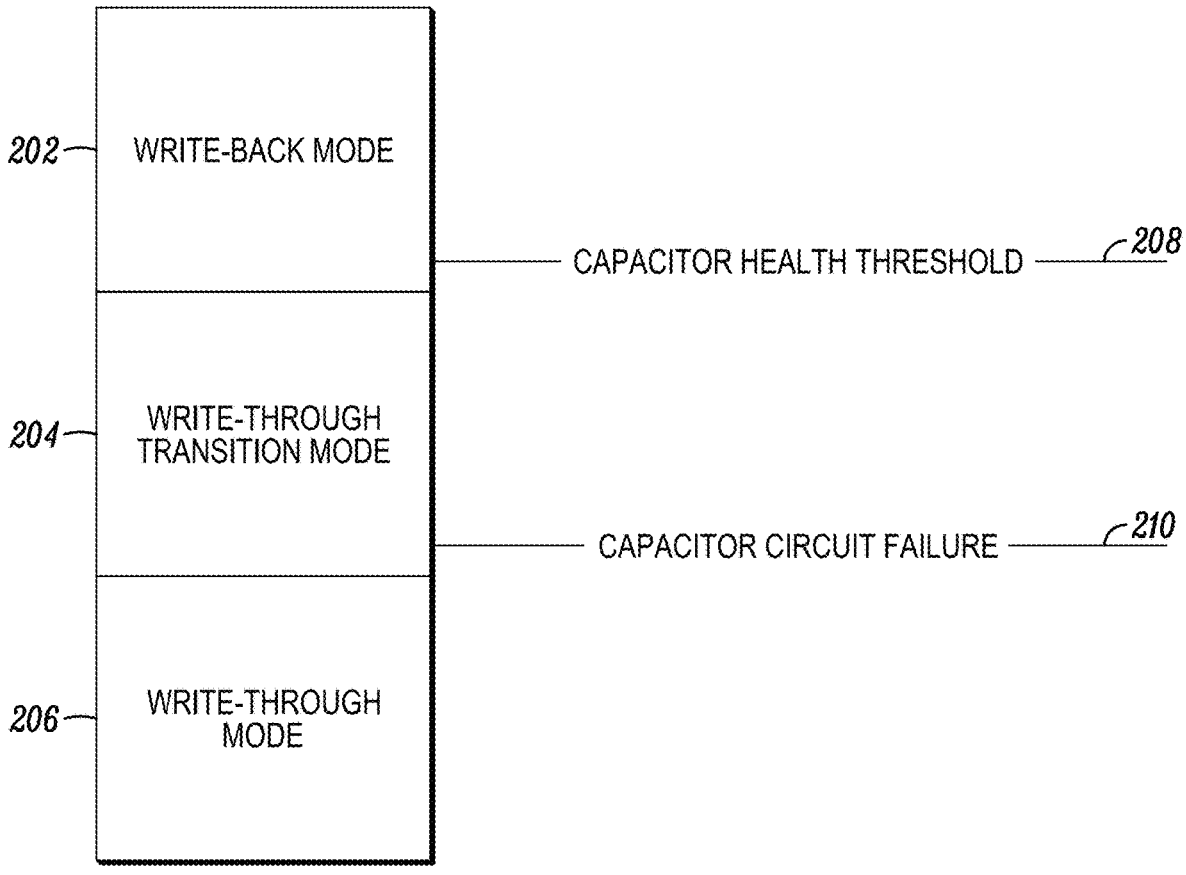
FIG. 2 is an example block diagram showing the operating modes of a storage device in relation to a capacitor health threshold in accordance with some implementations.

FIG. 2 is an example block diagram showing the operating modes of a storage device in relation to a capacitor health threshold in accordance with some implementations. Storage device 104 may operate in write-back mode 202, write-through transition mode 204 and write-through mode 206. Storage device 104 may set a capacitor health threshold 208 to ensure that there may be sufficient capacitor power to flush acknowledged host data from RAM 106 to memory device 110. When the capacity power is greater than capacitor health threshold 208 and storage device 104 is operating in write-back mode 202 with power loss protection, storage device 104 may not tolerate incomplete shutdowns as this may cause acknowledged host data to not be flushed from RAM 106 to memory device 110. As such when storage device 104 is operating in write-back mode 202 and the capacity power is greater than capacitor health threshold 208, if an incomplete shutdown occurs, storage device 104 may enter a panic state. When storage device 104 is operating in write-back mode 202 and the capacity power is greater than the capacitor health threshold, if a complete shutdown occurs, storage device 104 may reenter the write-back mode 202.

Storage device 104 may enter write-through transition mode 204 when the capacity power is less than capacitor health threshold 208 but above a level of a capacitor circuit failure 210. When storage device 104 is operating in write-through transition mode 204 with power loss protection, storage device 104 may not tolerate incomplete shutdowns as this may cause acknowledged host data to not be flushed from RAM 106 to memory device 110. As such when storage device 104 is operating in write-through transition mode 204 and an incomplete shutdown occurs, storage device 104 may enter a panic state. When storage device 104 is operating in write-through transition mode 204 and a complete shutdown occurs, storage device 104 may obtain the first transition flag from memory device and reenter the write-through transition mode 204. When storage device 104 flushes the acknowledged host data from RAM 106 to memory device 110, storage device 104 may set a second transition flag, store the second transition flag in memory device 110 and enter write-through mode 206.

Storage device 104 may enter write-through mode 206 after flushing the acknowledged host data from RAM 106 to memory device 110 in write-through transition mode 204. When storage device 104 is operating in write-through mode 206, storage device 104 may tolerate incomplete shutdowns and may perform ungraceful shutdown recovery after an incomplete shutdown. As indicated above FIG. 2 is provided as an example. Other examples may differ from what is described in FIG. 2.

FIG. 3 is an example flow diagram for transitioning the storage device from a write-back mode to a write-through mode in accordance with some implementations. At 310, storage device 104 may perform IO operations in the write-back mode. At 320, storage device 104 may determine that the power provided by the capacitor is less than a capacitor health threshold. At 330, storage device 104 may enter a write-through transition mode. At 340, storage device may save the first transition flag in memory device 110. At 350, storage device 104 may flush the acknowledged host data in RAM 106 to memory device 110. At 360, storage device 104 may save a second transition flag in memory device 110 and enter the write-through mode. As indicated above FIG. 3 is provided as an example. Other examples may differ from what is described in FIG. 3.

Figure 4:
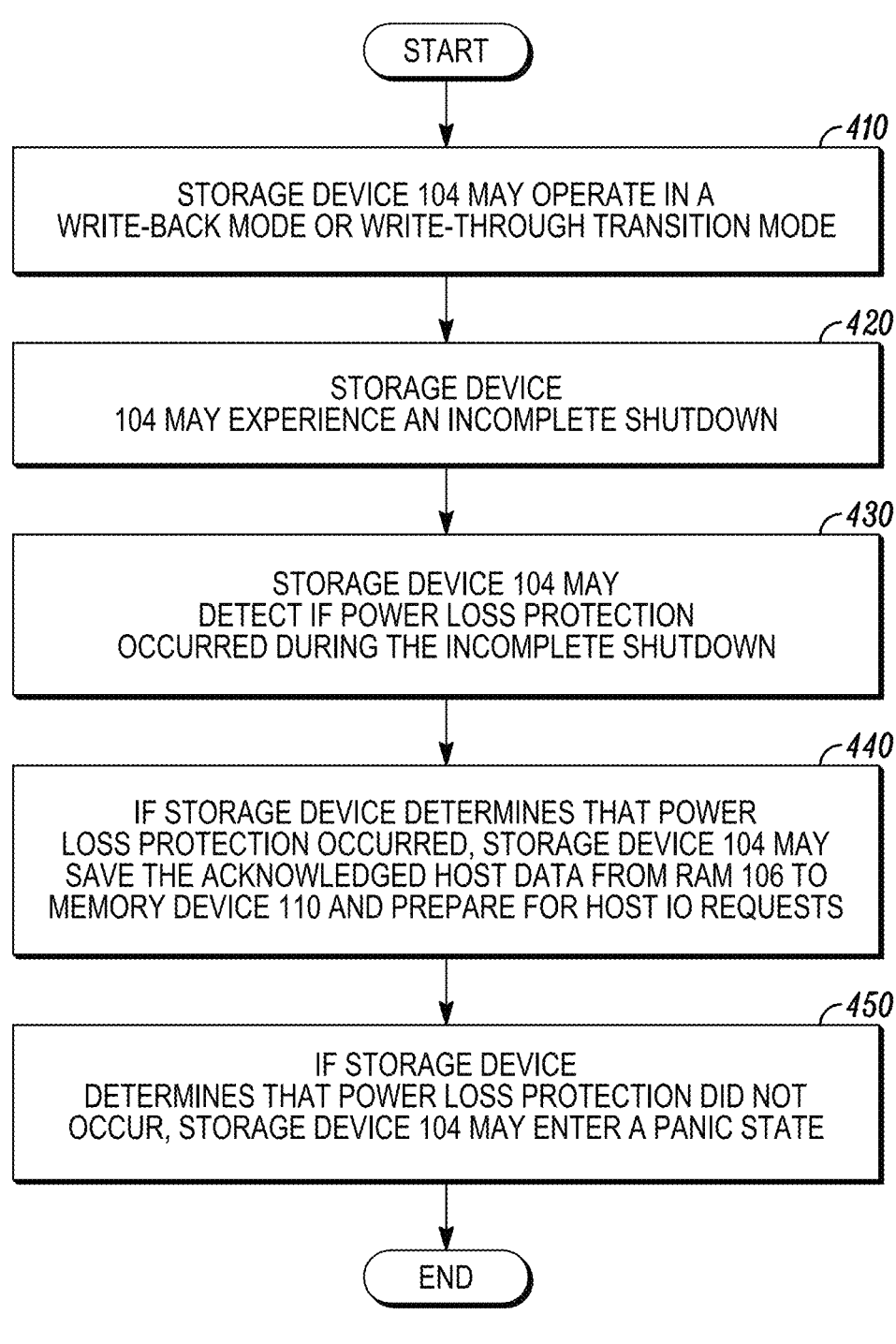
FIG. 4 is an example flow diagram for handling an incomplete shutdown in a write-back mode or write-through transition mode on a storage device in accordance with some implementations.

FIG. 4 is an example flow diagram for handling an incomplete shutdown in a write-back mode or write-through transition mode on a storage device in accordance with some implementations. At 410, storage device 104 may operate in a write-back mode or write-through transition mode. At 420, storage device 104 may experience an incomplete shutdown. At 430, storage device 104 may detect if power loss protection occurred during the incomplete shutdown. At 440, if storage device determines that power loss protection occurred, storage device 104 may save the acknowledged host data from RAM 106 to memory device 110 and prepare for host IO requests. At 450, if storage device determines that power loss protection did not occur, storage device 104 may enter a panic state. As indicated above FIG. 4 is provided as an example. Other examples may differ from what is described in FIG. 4.

Figure 5:
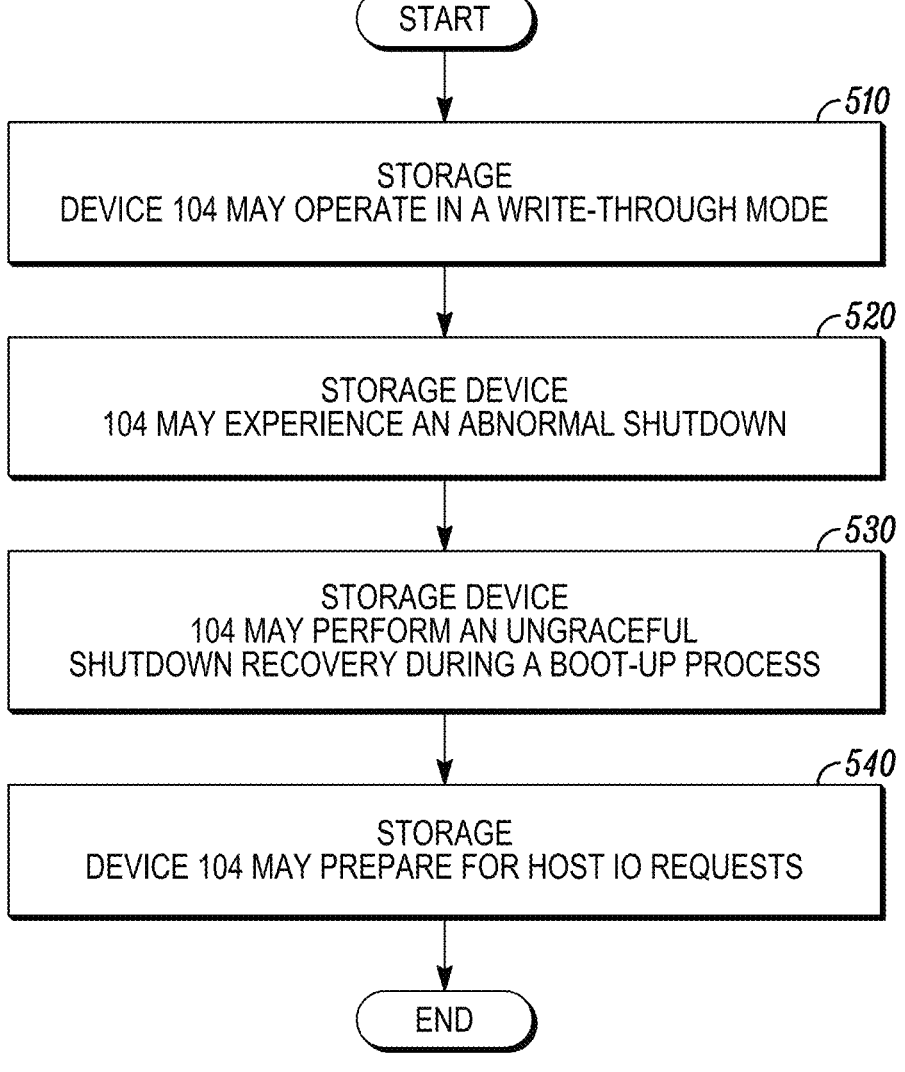
FIG. 5 is an example flow diagram for handling an incomplete shutdown in a write-through mode on a storage device in accordance with some implementations.

FIG. 5 is an example flow diagram for handling an incomplete shutdown in a write-through mode on a storage device in accordance with some implementations. At 510, storage device 104 may operate in a write-through mode. At 520, storage device 104 may experience an abnormal shutdown. At 530, storage device 104 may perform an ungraceful shutdown recovery during a boot-up process. At 540, storage device 104 may prepare for host IO requests. As indicated above FIG. 5 is provided as an example. Other examples may differ from what is described in FIG. 5.

FIG. 6 is an example flow diagram of a boot-up process on the storage device in accordance with some implementations. At 610, during a boot-up process, storage device 104 may retrieve the drive mode from memory device 110. At 620, storage device 104 may determine when it is in the write-back mode and if the previous shutdown was incomplete, and storage device may enter the panic state. At 630, storage device 104 may determine when it is in the write-back mode and if the previous shutdown was complete, and storage device 104 may perform the boot-up and set up to process host IO requests. At 640, if storage device retrieved the first transition flag from memory device 110 during the boot-up process, storage device 104 may enter the write-through mode transition. At 650, if storage device 110 determines that the previous shutdown was incomplete, storage device 104 may enter the panic state. At 660, if storage device 110 determines that the previous shutdown was complete, storage device 104 may resume the write-through mode transition process, and once the write-through mode transition process is complete, set a second transition flag in memory device 110, enter the write-through mode, perform the boot-up, and set up to process host I/O requests.

At 670, if storage device retrieved the second transition flag from memory device 110 during the boot-up process, storage device 104 may enter the write-through mode and, if the previous shutdown was incomplete, storage device 104 may perform ungraceful shutdown recovery, perform the boot-up, and set up to process host I/O requests. At 680, if the previous shutdown was complete, storage device 104 may perform the boot-up and set up to process host I/O requests. As indicated above FIG. 6 is provided as an example. Other examples may differ from what is described in FIG. 6.

Figure 7:
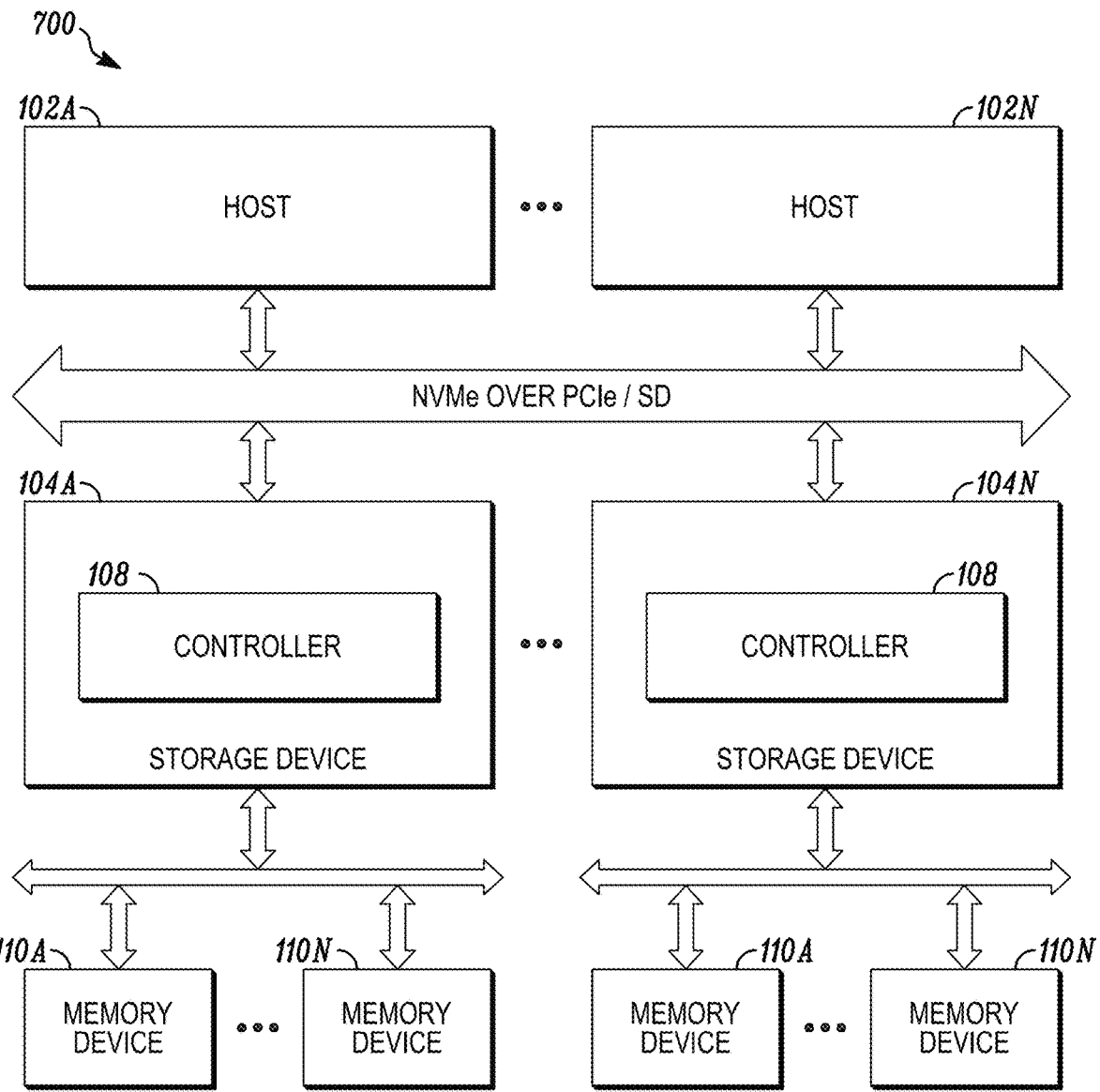
FIG. 7 is a diagram of an example environment in which systems and/or methods described herein are implemented.

FIG. 7 is a diagram of an example environment in which systems and/or methods described herein are implemented. As shown in FIG. 7, Environment 700 may include hosts 102-102*n* (referred to herein as host(s) 102), and one or more storage devices 104*a*-104*n* (referred to herein as storage device(s) 104). Storage device 104 may include a controller 108 to transition from a write-back mode to a write-through mode via a write-through transition mode. Hosts 102 and storage devices 104 may communicate via Non-Volatile Memory Express (NVMe) over peripheral component interconnect express (PCI Express or PCIe), SD, or the like.

Devices of Environment 700 may interconnect via wired connections, wireless connections, or a combination of wired and wireless connections. For example, the network in FIG. 7 may include NVMe over Fabric (NVMe-oF) Internet Small Computer Systems Interface (iSCSI), Fibre Channel (FC), Fibre Channel Over Ethernet (FCOE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of Environment 700 may perform one or more functions described as being performed by another set of devices of Environment 700.

Figure 8:
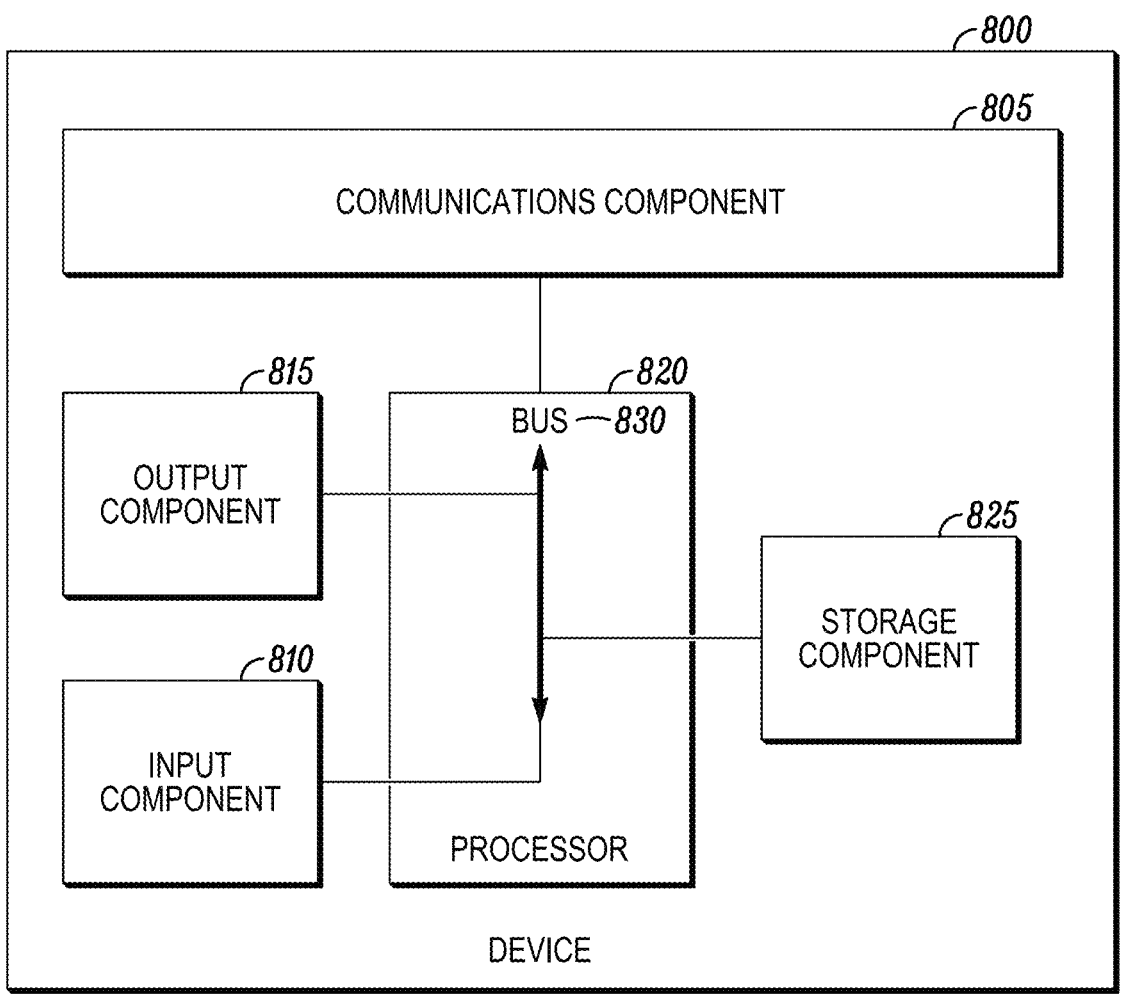
FIG. 8 is a diagram of example components of one or more devices of FIG. 1.

FIG. 8 is a diagram of example components of one or more devices of FIG. 1. In some implementations, host 102 may include one or more devices 800 and/or one or more components of device 800. Device 800 may include, for example, a communications component 805, an input component 810, an output component 815, a processor 820, a storage component 825, and a bus 830. Bus 830 may include components that enable communication among multiple components of device 800, wherein components of device 800 may be coupled to be in communication with other components of device 800 via bus 830.

Input component 810 may include components that permit device 800 to receive information via user input (e.g., a keypad, a keyboard, a mouse, a pointing device, and a network/data connection port, or the like), and/or components that permit device 800 to determine the location or other sensor information (e.g., an accelerometer, a gyroscope, an actuator, another type of positional or environmental sensor). Output component 815 may include components that provide output information from device 800 (e.g., a speaker, display screen, and network/data connection port, or the like). Input component 810 and output component 815 may also be coupled to be in communication with processor 820.

Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 may include one or more processors capable of being programmed to perform a function. Processor 820 may be implemented in hardware, firmware, and/or a combination of hardware and software.

Storage component 825 may include one or more memory devices, such as random-access memory (RAM 106), read-only memory (ROM), and/or another type of dynamic or static storage device (e.g., a flash memory, a magnetic memory, and/or optical memory) that stores information and/or instructions for use by processor 820. A memory device may include memory space within a single physical storage device or memory space spread across multiple physical storage devices. Storage component 825 may also store information and/or software related to the operation and use of device 800. For example, storage component 825 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 805 may include a transceiver-like component that enables device 800 to communicate with other devices, such as via a wired connection, a wireless connection, or a combination of wired and wireless connections. The communications component 805 may permit device 800 to receive information from another device and/or provide information to another device. For example, communications component 805 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 805 may also include one or more broadband and/or narrowband transceivers and/or other similar types of wireless transceiver configurable to communicate via a wireless network for infrastructure communications. Communications component 805 may also include one or more local area network or personal area network transceivers, such as a Wi-Fi transceiver or a Bluetooth transceiver.

Device 800 may perform one or more processes described herein. For example, device 800 may perform these processes based on processor 820 executing software instructions stored by a non-transitory computer-readable medium, such as storage component 825. As used herein, the term "computer-readable medium" refers to a non-transitory memory device. Software instructions may be read into storage component 825 from another computer-readable medium or from another device via communications component 805. When executed, software instructions stored in storage component 825 may cause processor 820 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to transition from operating in a write-back mode to a write-through mode and to use a transition mode to maintain data integrity on a boot-up, the storage device comprising:

a volatile memory to store acknowledged host data that is not written to a persistent memory;

the persistent memory to store the host data; and a controller to operate in a write-back mode when a capacitor power is greater than a threshold that is set for a capacitor to flush acknowledged host data in the volatile memory to the persistent memory during a power loss protection shutdown process in an ungraceful shutdown, to enter a read-only mode on boot up of the storage device when the controller determines that a recovery during the power loss protection shutdown process is incomplete, to operate in a write-through transition mode and store a first transition flag in the persistent memory when the capacitor power is less than the threshold and to flush the acknowledged host data in the volatile memory to the persistent memory when operating in the write-through transition mode;

to maintain the storage device in the write-through transition mode after a successful power loss protection shutdown process while the storage device is in the write-through transition mode and the first transition flag is stored in the persistent memory and enter a read-only state after an unsuccessful power loss protection shutdown process while the storage device is in the write-through transition mode and the first transition flag is stored in the persistent memory; and to store a second transition flag in the persistent memory to prepare the storage device to enter the write-through mode and move to the write-through mode when the acknowledged host data is copied to the persistent memory.

2. The storage device of claim 1, wherein the capacitor power is used to provide power loss protection in case of power failure.

3. The storage device of claim 1, wherein the threshold is set at a level above which power provided by at least one capacitor is sufficient to flush the acknowledged host data in the volatile memory to the persistent memory.

4. The storage device of claim 1, wherein when operating in one of the write-back mode and the write-through transition mode, the controller uses the capacitor power to flush the acknowledged host data in the volatile memory to the persistent memory during a power loss protection shutdown.

5. The storage device of claim 1, wherein when the storage device is powered up and the controller retrieves the second transition flag from the persistent memory, the controller enters the write-through mode, determines that a previous shutdown was incomplete, performs ungraceful recover, re-boots the storage device and sets the storage device up to process host requests.

6. The storage device of claim 1, wherein when the storage device is powered up and the controller retrieves the second transition flag from the persistent memory, the controller enters the write-through mode, determines that a previous shutdown was complete, re-boots the storage device and sets the storage device up to process host request.

7. The storage device of claim 1, wherein the controller detects capacitor circuit failure, the controller compares the threshold to power provided by a set of emergency capacitors and enters the write-through transition mode when the power provided by the set of emergency capacitors is less than the threshold.

8. The storage device of claim 1, wherein when the capacitor power falls below the threshold while storage device is in the write-back mode, storage device enters the write-through transition mode.

9. The storage device of claim 1, wherein when operating in the write-through mode, after a shutdown, the storage device recovers host data from the persistent memory at a commit point.

10. A method for transitioning from operating in a write-back mode to a write-through mode on a storage device and for using a transition mode to maintain data integrity on a boot-up, the storage device comprises a controller to execute the method comprising:

operating in a write-back mode when a capacitor power is greater than a threshold that is set for a capacitor to flush acknowledged host data in a volatile memory to a persistent memory during a power loss protection shutdown process in an ungraceful shutdown and flushing acknowledged host data in a volatile memory to a persistent memory;

entering a read-only mode on boot up of the storage device when the controller determines that a recovery during the power loss protection shutdown process is incomplete;

switching to operate in a write-through transition mode and storing a first transition flag in the persistent memory when the capacitor power is less than the threshold and flushing the acknowledged host data in the volatile memory to the persistent memory;

maintaining the storage device in the write-through transition mode after a successful power loss protection shutdown process while the storage device is in the write-through transition mode and the first transition flag is stored in the persistent memory and entering a read-only state after an unsuccessful power loss protection shutdown process while the storage device is in the write-through transition mode and the first transition flag is stored in the persistent memory and storing a second transition flag in the persistent memory to prepare the storage device to enter the write-through mode and moving to a write-through mode when the acknowledged host data is copied to the persistent memory.

11. The method of claim 10, further comprising using the capacitor power to provide power loss protection in case of power failure.

12. The method of claim 10, further comprising setting the threshold at a level above which power provided by at least one capacitor is sufficient to flush the acknowledged host data in the volatile memory to the persistent memory.

13. The method of claim 10, wherein when operating in one of the write-back mode and the write-through transition mode, using the capacitor power to flush the acknowledged host data in the volatile memory to the persistent memory during a power loss protection shutdown.

14. The method of claim 10, when the storage device is powered up and the controller retrieves the second transition flag from the persistent memory, the method includes entering the write-through mode, determining that a previous shutdown was incomplete, performing ungraceful recover, re-booting the storage device and setting the storage device up to process host requests.

15. The method of claim 10, when the storage device is powered up and the controller retrieves the second transition flag from the persistent memory, the method includes entering the write-through mode, determining that a previous shutdown was complete, re-booting the storage device and setting the storage device up to process host requests.

16. The method of claim 10, further comprising detecting capacitor circuit failure, comparing the threshold to power provided by a set of emergency capacitors and entering the write-through transition mode when the power provided by the set of emergency capacitors is less than the threshold.

17. The method of claim 10, further comprising entering the write-through transition mode when the capacitor power falls below the threshold while storage device is in the write-back mode.

18. The method of claim 10, further comprising recovering host data from the persistent memory at a commit point when operating in the write-through mode after a shutdown.

19. A storage device to transition from operating in a write-back mode to a write-through mode and to use a transition mode to maintain data integrity on a boot-up, the storage device comprising:

a volatile memory to store acknowledged host data;

a persistent memory to store the host data; and a controller to boot-up the storage device and obtain a drive state, determine if the storage device is operating in one of a write-back mode, a write-through transition mode, and a write-through mode, wherein in the write-through transition mode the controller stores a first transition flag in the persistent memory and flushes the acknowledged host data in the volatile memory to the persistent memory, enter a read-only state if the storage device is operating in one of the write-back mode and the write-through transition mode and a previous shutdown is incomplete, perform an ungraceful shutdown recovery if the storage device is operating in the write-through mode and the previous shutdown is incomplete, and complete the boot-up in one of the write-back mode, the write-through transition mode, and the write-through mode that was used prior to the previous shutdown if the previous shutdown is complete.

20. The storage device of claim 19, wherein the controller flushes acknowledged host data in a volatile memory to a persistent memory when operating in one of the write-back mode and the write-through transition mode and enters the write-through mode after flushing the acknowledged host data when operating in the write-through transition mode.

* * * * *